Aug. 4, 1942.          J. J. TAYLOR          2,291,847
COTTER PIN
Filed Dec. 24, 1940
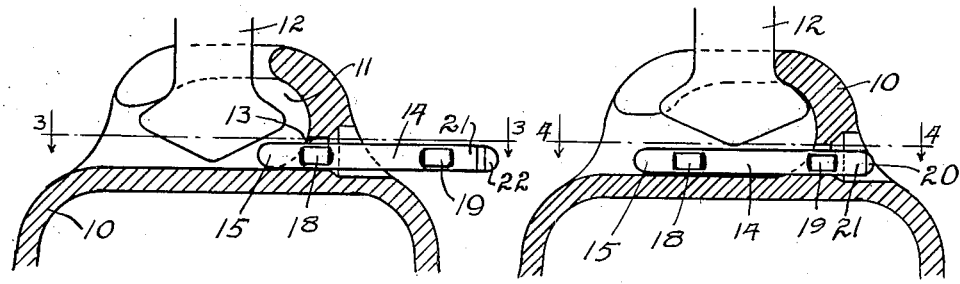
Fig. 1.                    Fig. 2.
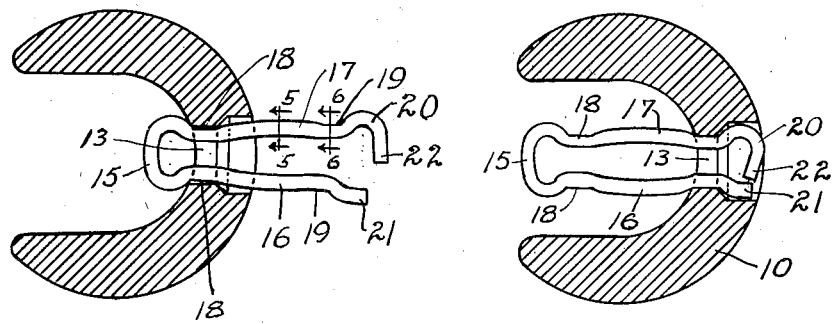
Fig. 3.                    Fig. 4.
   
Fig. 5.        Fig. 6.
Inventor
John J. Taylor
By Alpheus J. Crane
Attorney Patented Aug. 4, 1942

2,291,847

UNITED STATES PATENT OFFICE 2,291,847

COTTER PIN

John J. Taylor, Wadsworth, Ohio, assignor to The Ohio Brass Company, Mansfield, Ohio, a corporation of New Jersey Application December 24, 1940, Serial No. 371,467

2 Claims. (Cl. 85—8.5)

This invention relates to locking devices for insulator fittings and has for one of its objects the provision of a locking device or cotter for pin and socket fittings which can be easily inserted, which will have spring pressed contact with the fitting, which will not accidentally become detached, and which can be easily moved into and out of active position.

A further object of the invention is to provide a device in the class named which shall be of improved construction and operation.

Other objects and advantages will appear from the following description.

The invention is exemplified by the combination and arrangement of parts shown in the accompanying drawing and described in the following specification and it is more particularly pointed out in the appended claims.

In the drawing:

Fig. 1 is a fragmentary sectional view of an insulator fitting having a locking device or cotter made according to the present invention and shown in an inactive position.

Fig. 2 is a view similar to Fig. 1 with the locking device in its active position.

Fig. 3 is a section on the line 3—3 of Fig. 1.

Fig. 4 is a section on line 4—4 of Fig. 2.

Fig. 5 is a section on the line 5—5 of Fig. 3.

Fig. 6 is a section on line 6—6 of Fig. 3.

One of the most common forms of connection for the units of a suspension string of insulators is a ball and socket connection in which the insulator cap is provided with a socket open at one side to receive a headed pin of the adjacent insulator in the string. When the headed pin is within the socket, it is moved endwise into its seat where it is held from lateral displacement by the curvature of the seat. Before the parts can be separated, the pin must be moved longitudinally to disengage it from its seat. In order to prevent disengagement of the pin and socket, a locking device or cotter is commonly inserted beneath the end of the pin so as to retain it in its seat in the socket and prevent lateral disengagement. The present invention contemplates an improved form of locking device or cotter which can be easily inserted through an opening in the wall of the socket member, but which has a bendable part for locking the cotter against accidental removal. The cotter, however, is movable longitudinally from an active to an inactive position to permit separation of the fittings when desired and is retained in either position by yielding detent portions. When in its active position, the cotter is spring pressed against the material of the fitting so as to insure good electrical connection between the parts to prevent discharge of sparks which in the case of loose connections gives rise to radio disturbances.

In the form of the invention illustrated, the numeral 10 designates an insulator cap having a socket 11 for receiving a headed pin 12. The cap 10 has a perforation 13 for receiving the locking device or cotter 14. The cotter is formed of a resilient bar bent into a loop 15 forming a head on one end of the cotter and providing diverging spring arms 16 and 17. The arms are bent inwardly adjacent the head to form a restricted neck portion and the outer faces of the arms at the neck portion are flattened to give each arm the cross-sectional contour shown in Fig. 6. The portions of the arms beyond the neck are slightly bowed outwardly, as shown in Figs. 3 and 4, and an inclined shoulder is formed on each arm at the ends of the flattened surfaces 18 so that when the neck portion is in registration with the perforation 13, the cotter will be held by the head 15 from further outward movement and will be displaceably held by the shoulders at the ends of the seat portions and by the outwardly curved contour of the arms against inward movement.

The free end of the arm 17 is provided with a flattened portion 19 similar to the seat portions 18 and beyond the seat 19 thus formed, the arm is curved outwardly at 20 to form a retaining shoulder at the outer end of the arm. The arm 16 is also provided with a seat portion 19 and an outwardly bent portion 21. At the outer end of the bent portion 20, the arm 17 extends inwardly to form a lug 22 which, in its initial position, projects beyond the end of the portion 21 so that when the two arms are pressed together the end of the portion 21 will move inside of the projection 22 to permit the arms to be sufficiently compressed to move through the perforation 13 for insertion of the cotter. After the cotter is in place, as shown in Figs. 1 and 3, the pin 12 is inserted into the socket and moved to the final seated position shown in Fig. 2. The projecting portion 22 of the arm 17 is then bent inwardly from the position shown in Fig. 3 to the position shown in Fig. 4. The cotter is then forced longitudinally to the left, as shown in the drawing, from the position shown in Figs. 1 and 3 to the position shown in Figs. 2 and 4. In this position it will prevent separation of the pin and cap as will be readily understood from the drawing. The inwardly bent projection 22 now registers with the end of the portion 21 so that the inward movement of the two arms relative to each other is limited by contact between the parts 21 and 22. This will prevent withdrawal of the cotter through the perforation 13, as will be readily understood from Fig. 4. With the parts thus assembled, a cotter is provided having opposite headed ends which prevent withdrawal of the cotter in either direction and having a resilient central portion which will yield sufficiently to permit movement of the cotter into and out of its active position without disengaging the cotter from the socket. In its active position the free ends of the arms 16 and 17 are spring pressed outwardly into contact with the periphery of the perforation 13 so that there is no loose electrical connection between the cotter and the fitting to give rise to sparking and radio disturbances. The cotter may be readily moved from its active position shown in Figs. 2 and 4 to an inactive position to permit separation of the parts for removal and replacement of a defective insulator unit or for any other purpose. Shifting of the cotter may be accomplished by pressure on the inner or left-hand end as viewed in the drawing or by inserting a hooked tool into the bent portion 20 and pulling outwardly. After the parts are in place, the cotter may be readily driven back into its active position by tapping the outer end. After the parts are assembled and the cotter is in place as shown in Fig. 3, the part 22 may be bent inwardly by any suitable tool such as a pair of pliers or a special tool having a slot for receiving the projection 22.

I claim:

1. A cotter for a suspension insulator formed of a spring bar and having an eye at one end and having spring held arms projecting away from said eye and diverging from each other, one arm having longitudinally spaced shoulders thereon adjacent its end for retaining said cotter in an opening in an insulator fitting with said arms engaging the walls of said opening and spring held against said walls at points adjacent the ends of said arms, the other one of said arms having a projection thereon extending toward the other arm and bendable into and out of position to register with the end of said other arm to retain said arms in spaced relation and said cotter in said perforation when said projection is in registration with the end of said other arm but permitting compression of said arms toward each other for insertion of said cotter when said projection is out of registration with the end of said one arm.

2. A cotter comprising a spring bar bent into a loop to form a head at one end of the cotter, the ends of said bar projecting from said loop to form spring arms, said arms being offset inwardly adjacent said head to form a restricted neck and being bowed outwardly at the side of said neck opposite said head and being offset inwardly at the ends of said outwardly bowed portions opposite said neck to provide contact seats adjacent the ends of said arms, said contact seats being held apart, when said arms are unrestrained, a distance greater than the maximum width of said neck, the ends of said arms beyond said seats being bent outwardly to form shoulders, one of said arms having a stop thereon movable into and out of registration with the end of the other arm, said arms being compressible toward each other when said stop is out of registration to compress said shoulders and reduce their overall spread to an amount approximately equal to the maximum width of said neck but said stop, when in registration with the end of the other arm, restricting compression of said arms to an amount for which the overall spread of said shoulders is approximately equal to the maximum width of said head.

JOHN J. TAYLOR.